United States Patent [19]
Emsens

[11] Patent Number: 6,161,471
[45] Date of Patent: Dec. 19, 2000

[54] MACHINE FOR THE AUTOMATIC PRODUCTION OF MEAT OR VEGETABLE BROCHETTES SPITTED ON WOODEN PICKS IN PARTICULAR

[76] Inventor: Michel Emsens, Z.A. Du Parc, 42490 Fraisses, France

[21] Appl. No.: 09/331,737

[22] PCT Filed: Feb. 23, 1998

[86] PCT No.: PCT/FR98/00348

§ 371 Date: Jun. 25, 1999

§ 102(e) Date: Jun. 25, 1999

[87] PCT Pub. No.: WO98/41100

PCT Pub. Date: Sep. 24, 1998

[30] Foreign Application Priority Data

Mar. 18, 1997 [FR] France .................................. 97 03516

[51] Int. Cl.[7] ........................... A22C 17/00; A22C 17/02; A47J 37/04
[52] U.S. Cl. ......................... 99/419; 99/421 H; 99/443 C
[58] Field of Search .................... 99/419–421 V, 99/443 R, 443 C, 386, 494, 516, 450.1; 29/432; 83/466.1; 227/3, 101, 103, 139; 452/149, 174; 426/421

[56] References Cited

U.S. PATENT DOCUMENTS

| | | |
|---|---|---|
| 4,837,895 | 6/1989 | Emsens . |
| 4,842,181 | 6/1989 | Walser . |
| 5,109,757 | 5/1992 | Dolle ........................................ 99/419 |
| 5,127,319 | 7/1992 | Dolle ........................................ 99/419 |
| 5,161,447 | 11/1992 | Emsens . |
| 5,740,722 | 4/1998 | Emsens . |

FOREIGN PATENT DOCUMENTS

| | | |
|---|---|---|
| 0113637 | 7/1984 | European Pat. Off. . |
| 2535169 | 5/1984 | France . |
| 2574252 | 6/1986 | France . |
| 2668895 | 5/1992 | France . |

*Primary Examiner*—Timothy Simone
*Attorney, Agent, or Firm*—Wall Marjama & Bilinski

[57] ABSTRACT

A machine for the automatic production of kebabs from a container whose side faces are slotted and filled with layers of meat and/or vegetables. The machine comprises at least a container insertion station, a station in which the container is skewered with sticks, a cutting station engaging with the container slots, for cutting the skewered layers of meat and/or vegetables, and a station in which the container containing the different skewered and cut layers of meat and/or vegetables is unloaded. The machine of the present invention also includes a supporting member having peripheral arrangements for the loading and centering of at least one container, the supporting member being fixed to rotary drive means in order to present the container or containers in succession to each of the stations arranged in a circular manner about the member.

10 Claims, 4 Drawing Sheets

MACHINE FOR THE AUTOMATIC PRODUCTION OF MEAT OR VEGETABLE BROCHETTES SPITTED ON WOODEN PICKS IN PARTICULAR

BACKGROUND OF THE INVENTION

Summary of the Invention

The present invention relates to the field of the shaping and processing of food products.

For the industrial production of kebabs, the use of machines specially designed to achieve this result is very well known. Basically, most known machines employ a container of general a parallel-piped shape in which the different layers of meat and/or vegetables are laid on top of each other. The four vertical faces of the container are slotted to allow the passage of cutter blades. The lid and/or the base of the container are pierced to allow the insertion, by automatic or other means, of wooden sticks, usually by means of an appropriate skewering device.

The skewering and cutting devices, as such, may take different forms. For example, the skewering device may be of the type described in patent FR 2535169, which uses a system of the different layers of meat and/or vegetables, or of the type described in European patent 0278879, which uses a system of tubes into which the wooden sticks are inserted.

The cutting device may be of the type described in patent FR 9010227. The operations of skewering, on the one hand, and cutting, on the other, may be carried out at the same station or at different stations. The cutting of the different layers of ready-skewered meat and/or vegetables is of course done in two perpendicular planes, so as to make kebabs. For this purpose, either two cutting devices are set at an angle of 90° to each other to make the two perpendicular cuts in succession, or the machine uses a single cutting station, in which case the container is pivoted through 90° so that the two perpendicular cuts can be made.

From this basic concept for producing kebabs industrially, a number of different solutions have been proposed to automate the whole production process from loading the container to its unloading.

An example of this is the teaching of patent FR 2574252 which describes an installation for the automated manufacture of kebabs. In essence, this installation comprises a certain number of stations arranged in line at regular intervals, in combination with a horizontal conveying device. This horizontal conveying device brings the containers one after the other, in succession, to four workstations, specifically a piercing station, a stick inserting station, a stick driving station in which the sticks are driven into the different layers of meat and/or vegetables, and lastly a cutting station. The method of transfer of the containers past each of the workstations necessitates a large amount of floor space.

This type of machine, in which there is linear transfer of the containers past the various workstations is also found in patent FR 2668895, which also relates to a machine for the preparation of kebabs. This machine comprises, in succession, an entrance station, a skewering station, a cutting station, a station in which the contents of the containers are discharged or demolded, and an empty container unloading station. In this machine, skewering takes place in a horizontal plane by means of a system of prepiercing rods and tubes. The cutting station comprises a plurality of vertically arranged blades that fit into the different slots of the container arranged in a horizontal plane. In addition, at the cutting station, the container is fixed to means capable of pivoting it through 90°, in order that the two perpendicular cuts can be made.

As indicated, the transfer of the containers to the various workstations is done in a linear manner. In other words, once again, this technical solution does not provide a compact machine capable of automatic skewering of the kebabs.

The purpose of the present invention is to solve the above-described problems in a simple, reliable, efficient and logical manner.

The object of the present invention is to automatically produce kebabs of meat and/or vegetables threaded in particular on wooden sticks, the objective being to integrate within a small and compact space, as opposed to any linear transfer system, a container insertion station, a skewering station, a cutting station and a container unloading station.

To solve this problem, a machine has been devised and developed for the automatic production of kebabs from a container filled with layers of meat and/or vegetables whose side faces are slotted, wherein said machine comprising at least one station for insertion among layers of meat and/or vegetables, a station in which the container is skewered with sticks, a cutting station engaging with the container slots for cutting the skewered layers of meat and/or vegetables, and a station in which the container containing the different skewered and cut layers of meat and/or vegetables are unloaded. The machine of the present invention also includes a supporting member having peripheral arrangements for the loading and centering of at least one container, wherein the supporting member is fixed to a rotary drive means in order to present the container or containers in succession to each of said stations and arranged in a circular manner about said member.

To solve the problem of moving the supporting member that receives the container or containers in a circle past each of the workstations, either the rotary drive shaft of the supporting member is arranged in a vertical plane, or the rotary drive shaft of the supporting member is arranged in a horizontal plane.

Another problem which it is an object of the invention to solve is the working in parallel and continuously to present several containers to each of the workstations. To solve such a problem, the supporting member consists of a carousel of cubical general shape, the two directly opposite faces of which are traversed by the rotary shaft, the other four faces comprising arrangements for the positioning and centering of a container. The various stations for charging, skewering, cutting and unloading are conveniently mounted on a supporting frame and are separated in space in such a way that as the carousel is driven around one quarter of a revolution the same container is brought in succession to each of said stations.

To solve the problem of presenting several containers in succession and simultaneously to each of the different workstations from a rotating supporting member that accommodates the containers, the insertion station is arranged at the bottom of the carousel so as to be in communication with the arrangements for positioning and centering one of the faces of said carousel, the container skewering station is offset by 90° with respect to the charging station so that the sticks are driven in a horizontal plane, the cutting station is located so as to present the cutter blades in a horizontal position, the slots of the container being arranged vertically, and the unloading station is offset by 90° with respect to the insertion station, in an opposite direction to the direction of the skewering station.

Another problem which the invention seeks to solve is how to use only four lids for all the containers. To this end, in the arrangements of each of the faces of the carousel, for the positioning and centering of the containers, the carousel has supporting parts able to receive the lid of the corresponding container, these parts being fixed to means for positioning the lid as required on the open face of the container.

To solve the problem of driving sticks simultaneously into the different layers of meat and/or vegetables, the skewering station comprises a series of tubes arranged in a horizontal plane, in line with holes present in the lid and/or floor of the container, the tubes accommodating the sticks; the assembly of the tubes is attached to a supporting member fixed to means of translational movement for pushing the tubes containing the sticks into the different layers of meat and/or vegetables, after which they withdraw the tubes so that only the sticks are left behind in the different layers of meat and/or vegetables. Advantageously, the tubes are operated in combination with an automatic stick loading system.

To solve the problem of cutting the different layers of ready-skewered meat and/or vegetables in two perpendicular planes in order to make the kebab the cutting station comprises two cutting systems set at an angle of 90° to each other so as to correspond to the two perpendicular adjacent faces of the container, each system having a plurality of blades corresponding to each of the slots of one face of the container, the blades being fixed to movement means to give them a translational movement combined with a pivoting movement.

BRIEF DESCRIPTION OF THE DRAWING

The invention is set forth below in greater detail with the aid of the figures of the accompanying drawings, wherein.

DESCRIPTION OF THE INVENTION

As is known to those skilled in the art, a machine for the industrial and automatic production of square or rectangular kebabs uses containers or molds (B) of parallel-piped shape which will be filled with various layers of meat and/or vegetables laid on top of each other. Each mold comprises four vertical faces cut through by vertical slots for the passage of cutter blades, as will be indicated in the course of the description. The four side faces of the mold are combined with a floor (S) and a lid (C). As will be indicated later, the lid and/or the floor are pierced by a plurality of holes for the insertion of wooden sticks (P). These molds or containers, as described, can open and reclose in different ways, automatically or otherwise. The containers are made from stainless steel or food-grade plastic, for example.

Figure 3:
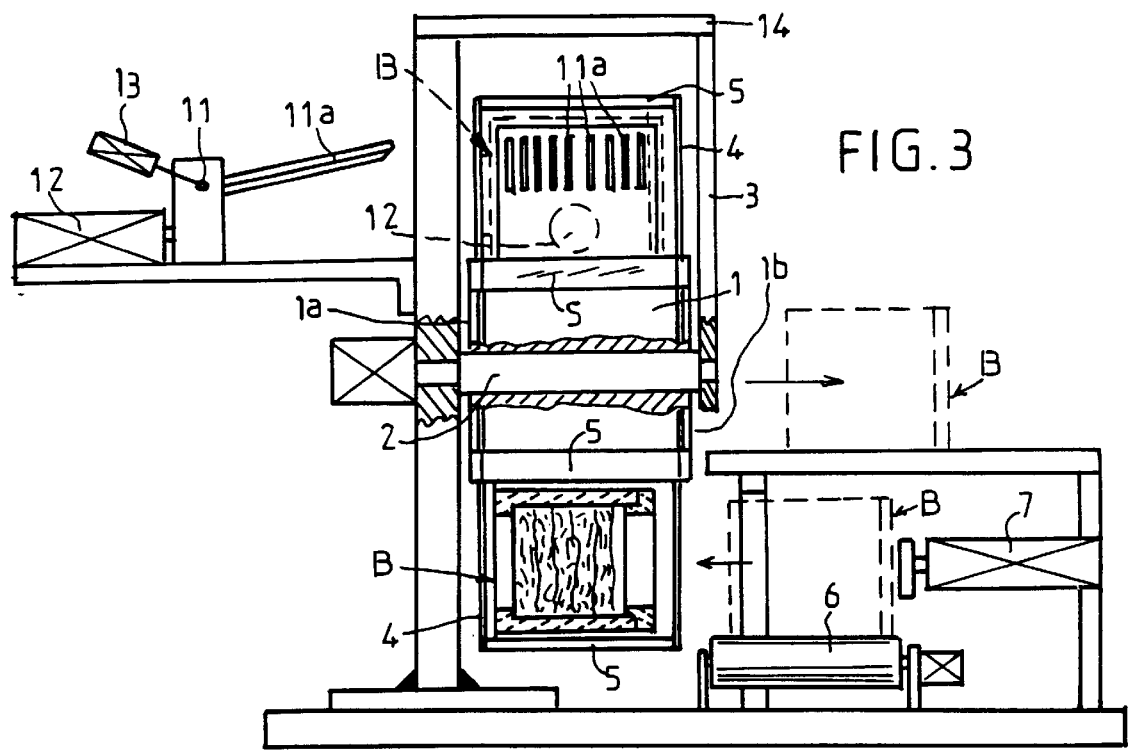
FIG. 3 is a side view in partial section of FIG. 2.
Figure 1:
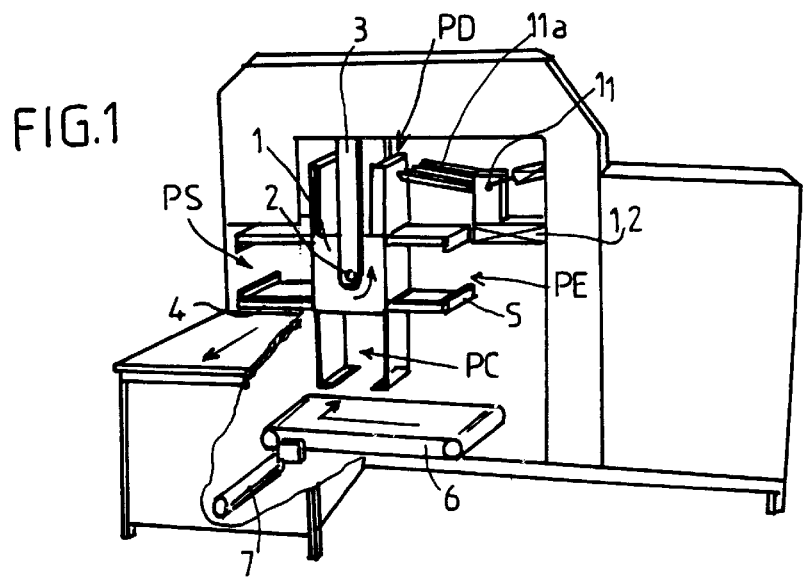
FIG. 1 is a schematic perspective view of an embodiment of the machine according to the invention.

With reference to FIGS. 1 and 3, and in accordance with a fundamental feature of the invention, the frame of the machine comprises a supporting member (1) having peripheral arrangements for loading and centering at least one, but preferably several, containers (B). The supporting member (1) is fixed to rotary drive means so that a container is presented in succession to different workstations, namely, an insertion station (PC), a skewering station (PE), a cutting station (PD) and an unloading station (PS).

To this end, the supporting member (1) consists of a carousel of generally cubical shape. The rotary drive shaft (2) of the carousel (1) is advantageously arranged in a horizontal plane. However, without departing from the scope of the invention, the rotary shaft (2) maybe in a vertical plane. The assembly formed by the carousel (1) and the rotary shaft (2) is conveniently mounted inside the frame of the machine, by means, for example, of a system of arms or supporting portal (3). According to these provisions, the rotary shaft (2) passes through two directly opposite faces (1*a*) and (1*b*) of the mold. The other four faces (1*c*), (1*d*), (1*e*) and (1*f*) of the carousel (1) are therefore arranged at 90° and each comprises arrangements for the positioning and centering of a container (B). For example, each of the faces (1*c*), (1*d*), (1*e*) and (1*f*) has, at each of its corners, supporting arms (4) which receive, directly or as attachments, guide components (5) which keep the container (B) in position.

The turning of the carousel (1), as described by means of the shaft (2), is performed by any appropriate known means and arrangement in such a way as to bring, in succession, each of the faces of the carousel (1), equipped with supporting arms between which the containers are positioned and centered, to each of the workstations (PC), (PE), (PD) and (PS). The insertion, skewering, cutting and unloading stations (PC), (PE), (PD) and (PS), respectively, are conveniently mounted on parts of the supporting frame and are separated in space, in such a way that by turning the carousel (1) through one quarter of a revolution, the same container (B) is brought in succession to each of the stations. A timing system is of course used to freeze the carousel so that each of its faces are presented to the different workstations for a predetermined period necessary for the work to be carried out.

Figure 2:
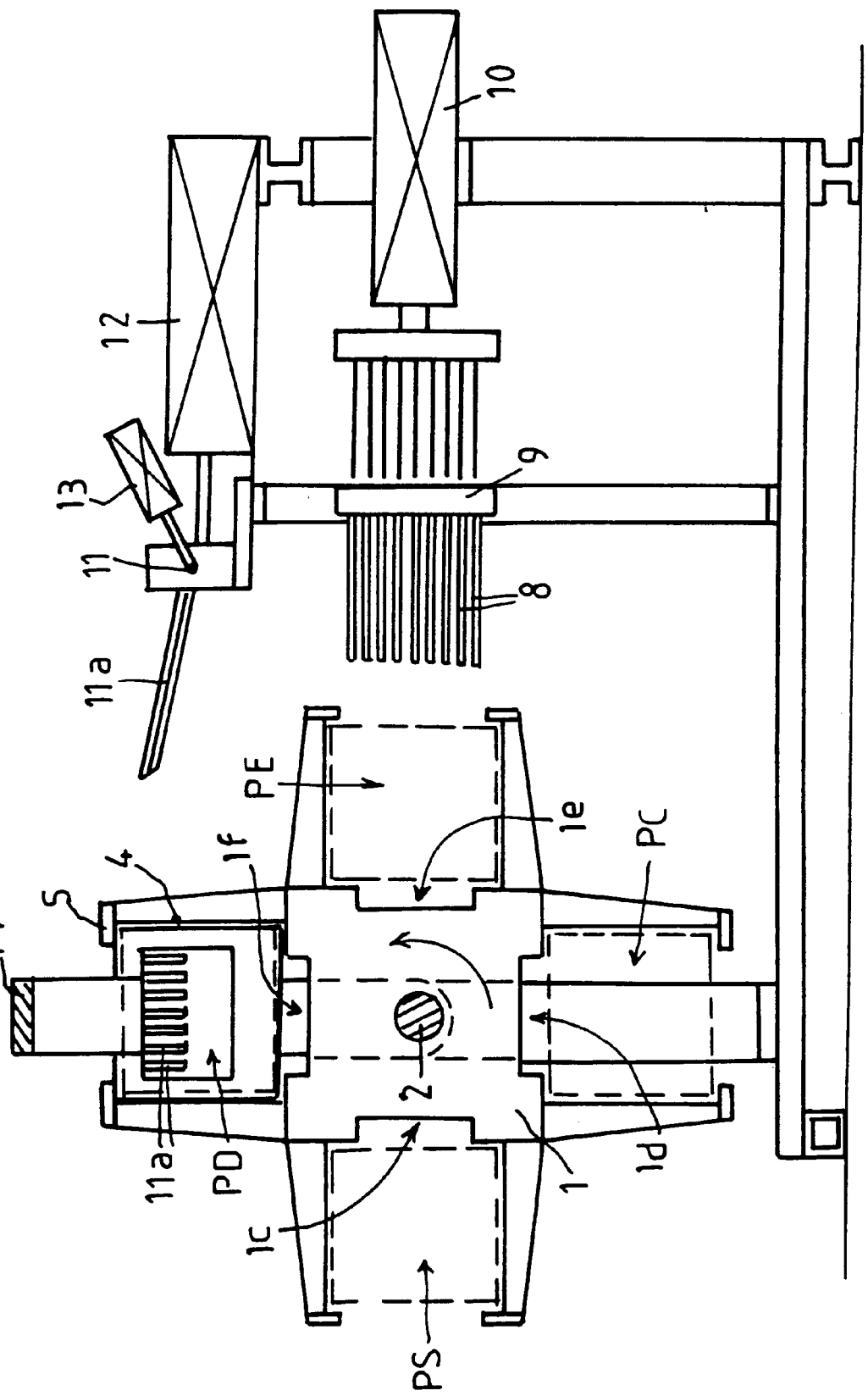
FIG. 2 is a front view showing in particular the construction of the container supporting member for presenting the containers in continuous succession to each of the workstation.

More particularly, and as shown in FIG. 2, the insertion station (PC) is arranged for example at the bottom of the carousel so as to be in communication with the arrangements for positioning and centering one of the faces. The skewering station (PE) is offset by 90° with respect to the insertion station (PC), this 90° offset being considered for example in the counterclockwise direction. As will be indicated later, the sticks are driven in a horizontal plane. The cutting station (PD) is located above the skewering station so as to present the cutter blades in a horizontal position in the center of the container, but also in line with the slots of the corresponding part of the container where they are arranged vertically. The unloading station (PS) is offset by 90° with respect to the charging station (PC), the 90° offset being considered in the clockwise direction. In other words, the unloading station (PS) is situated opposite the skewering station.

Leading to the insertion station the machine has, for example, a conveyor (6) on which a number of containers previously filled with different layers of meat and/or vegetables can be placed. When the container is positioned in line with the charging station, an actuator (7) or the like, arranged in a plane perpendicular to the conveyor (6), pushes the container into the arrangements (4) and (5) of any one of the faces (1*c*), (1*d*), (1*e*) and (1*f*) of the carousel, it being understood that the various positioning and centering arrangements for each of the carousel faces are exactly identical.

Figure 4:
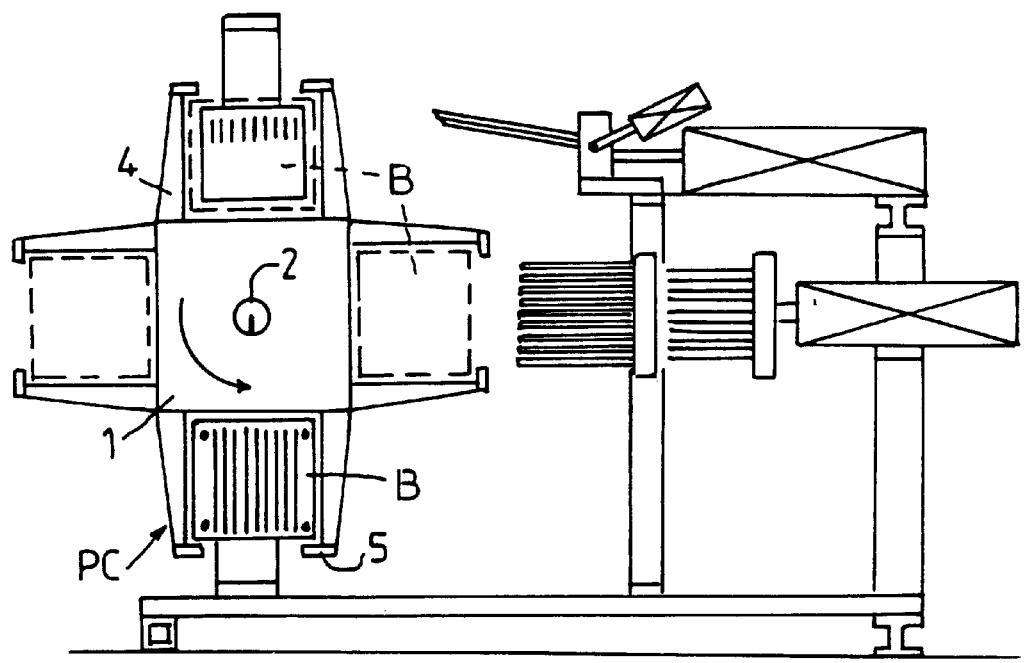
FIGS. 4, 5, 6 and 7 are schematic views showing the principle on which the machine according to the invention operates. For the sake of clarity of the drawings, only one container is illustrated in heavy lines being submitted in succession to the different stations; the other containers are illustrated in broken lines.
Figure 5:
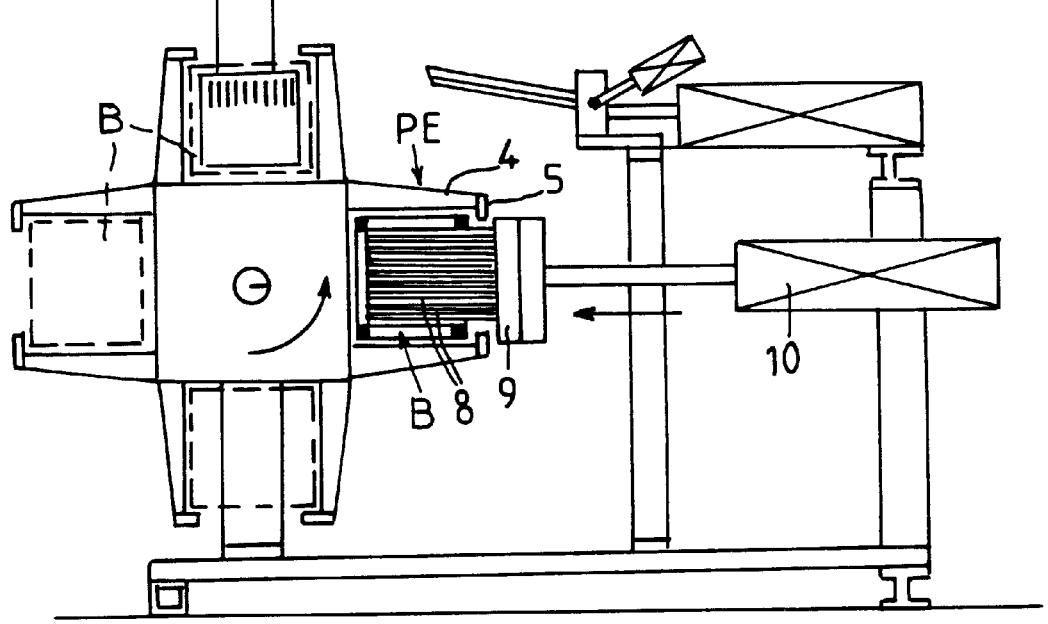

The skewering device (DE) may be embodied in different ways. Advantageously, the skewering device is of the type described in European patent 0278179. As shown in FIGS. 4 and 5, basically, this skewering station comprises a series of tubes (8) arranged in a horizontal plane, in line with the holes present in the lid and/or floor of the container (B). These tubes are designed to take the wooden sticks and are attached to a supporting member (9) fixed to means of translational movement (10) of the actuator type, for example. In accordance with these technical provisions, the tubes equipped with sticks are pushed through the different layers of meat and/or vegetables by the translational movement, after which as the translational movement is reversed they are withdrawn from the different layers of meat and/or vegetables, so that only the wooden sticks are left behind. Advantageously, the skewering device, in particular the guide tubes (8), are operated in combination with any system for automatically supplying them with wooden sticks. The guide tubes are arranged precisely perpendicularly to the corresponding face of the carousel in the skewering position.

Figure 6:
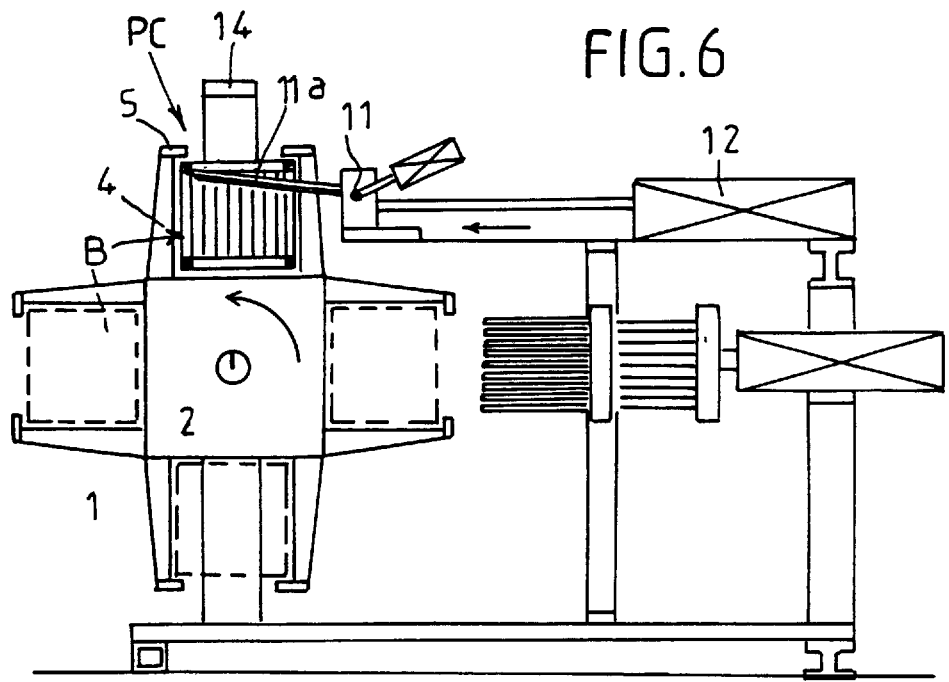
Figure 7:
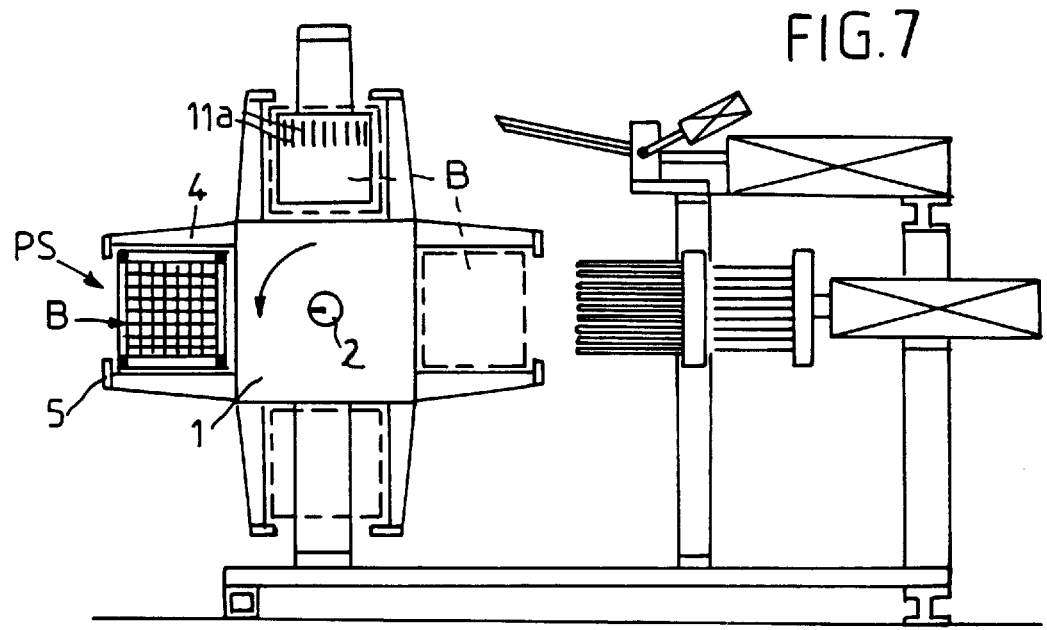

Above the skewering station (PE), approximately parallel to the latter, the frame of the machine has a supporting part which receives the cutting station as such (PD). This cutting station is advantageously of the type described in patent FR 9010227. As show in FIGS. 6 and 7, basically, this cutting station has a pivoting head (11) fixed to a plurality of blades (11a) corresponding to the different slots of the side faces of the container. This pivoting head (11) is fixed both to a control actuator (12) for translational movements, and to an actuator (13) for rotary movements, so that it executes a movement of a limited arc of a circle in order to make the cut, combined with the translational movement. Another cutting system, identical to that described, is arranged at 90° so as to correspond to the other adjacent face of the container offset at an angle of 90°. These arrangements therefore make it possible to cut the different layers of meat and/or vegetables in combination with the slots of the container in two perpendicular planes. In this cutting position the container (B) contained inside the positioning and centering arrangements of the corresponding face of the carousel is acted upon by a pressure plate (14) fixed to an actuator to keep the container firmly in position, in view of the forces generated by the penetration of the cutter blades into the container.

At the unloading station the machine frame has a pusher fixed to an actuator for unloading the skewered and cut container onto a work surface.

In view of these arrangements and as shown in FIGS. 4, 5, 6 and 7, it is therefore clear that under the rotary driving action of the carousel (1), one container (B) is presented in succession to each of the workstations, namely the insertion station, the skewering station, the cutting station and the unloading station. Obviously, given the fact that the supporting carousel (1) can be fitted with four containers, the different operations are synchronized and carried out simultaneously. In other words, when one container is moved to the charging or insertion station, another container is submitted to the skewering device, another container is submitted to the cutter device, and lastly another container is submitted to the ejection system.

It should also be noted that each of the faces of the containers for the positioning and centering of the containers, particularly against the opposing faces of the carousel, may be fitted with any type of arrangement for the securing of lids by any mechanical system allowing them to be moved away from or toward the center of the carousel in the course of the different working stages. With this arrangement it is possible to use no more than four lids for all of the molds. It should also be noted that in this case the lid, besides its function of closing the mold, can also help to immobilize the latter with respect to the carousel.

To summarize, the cycle carried out by a mold is as follows:

The mold or container is inserted into the lowest position of the carousel. If appropriate, the lid situated above the mold descends and closes the revolution so that the mold is in a position such as to allow skewering with the axes of the sticks horizontal, which means that the sticks can remain horizontal throughout their selection and skewering cycle, the carousel (1) executes another quarter of a revolution so that the mold is again in a position in which the meat can be cut. The slots are vertical, as are the blades (11a), which are in a vertical plane. In this position the cut can be of good quality, the carousel executes another quarter of a revolution. If necessary, the lid moves away from the mold and the mold can then be ejected. Note that in this ejection position the sticks are in a horizontal plane, which facilitates demolding.

As is apparent, the advantages of the present invention are clear from the description, and the whole machine is very compact, having no linear transfer from one station to the next, and the operating cycle is entirety automatic, including insertion of containers, selection of sticks, skewering, cutting and ejection of the containers.

What is claimed is:

1. A machine for the automatic production of kebabs from a container filled with layers of meat and/or vegetables and whose side faces are slotted, said machine comprising:

a container insertion station;

a skewering station in which the container is skewered with sticks;

a cutting station engaging with the container slots, for cutting the skewered layers of meat and/or vegetables; and an unloading station in which the container containing the different skewered and cut layers of meat and/or vegetables are unloaded, wherein said machine also includes a supporting member having peripheral arrangements for the loading and centering of at least one container, said supporting member being fixed to rotary drive means in order to present at least one container in succession to each of said stations arranged in a circular manner about said member.

2. A machine as claimed in claim 1, in which the rotary drive means of the supporting member is arranged in a vertical plane.

3. A machine as claimed in claim 1, in which the rotary drive means of the supporting member is arranged in a horizontal plane.

4. A machine as claimed in claim 1, in which the supporting member consists of a carousel of cubical general shape, two directly opposite faces of which are traversed by the rotary drive means, and four other faces comprising arrangements for positioning and centering of a container.

5. A machine as claimed in claim 1, in which said stations are mounted on a supporting frame and are separated such that as the carousel is driven around one quarter of a revolution the same container is brought in succession to each of said stations.

6. A machine according to claim 1, in which the insertion station is arranged at a bottom of the carousel so as to be in communication with the arrangements for positioning and centering one of the faces of said carousel;

the skewering station is offset by 90° with respect to the insertion station so that the sticks are driven in a horizontal plane;

the cutting station is located so as to present cutter blades in a horizontal position, slots of the container being arranged vertically; and the unloading station is offset by 90° with respect to the insertion station, in an opposite direction to the direction of the skewering station.

7. A machine as claimed in claim 1, in which the carousel comprises supporting parts able to receive the lid of the corresponding container, said parts being fixed to means for positioning the lid as required on the open face of the container for the positioning and centering of the containers.

8. A machine as claimed in claim 1, in which the skewering station comprises a series of tubes arranged in a horizontal plane in line with holes present in the lid and/or floor of the container, said tubes accommodating sticks, the assembly of said tubes being attached to a supporting member fixed to means of translational movement for pushing the tubes containing sticks into different layers of meat and/or vegetables, such that upon withdrawal of the tubes only sticks are left in layers of meat and/or vegetables.

9. A machine as claimed in claim 1, in which the tubes are operated in combination with an automatic stick loading system.

10. A machine as claimed in claim 1, in which the cutting station comprises two cutting systems set at an angle of 90° to each other so as to correspond to two perpendicular adjacent faces of the container, each system having a plurality of blades corresponding to each of the slots of one face of the container, said blades being fixed to movement means to provide said blades with a translational movement combined with a pivoting movement.

\* \* \* \* \*